(12) United States Patent
Tsujino et al.

(10) Patent No.: US 7,251,057 B2
(45) Date of Patent: Jul. 31, 2007

(54) DIGITAL CAMERA

(75) Inventors: Kazuhiro Tsujino, Osaka (JP); Mitsuaki Kurokawa, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 991 days.

(21) Appl. No.: 10/171,633

(22) Filed: Jun. 17, 2002

(65) Prior Publication Data

US 2002/0196483 A1 Dec. 26, 2002

(30) Foreign Application Priority Data

Jun. 19, 2001 (JP) ............................. 2001-184740

(51) Int. Cl.
- *G06F 17/00* (2006.01)
- *G06F 17/16* (2006.01)
- *G03F 3/08* (2006.01)
- *G03B 7/00* (2006.01)

(52) U.S. Cl. ........................ 358/1.9; 358/520; 358/530; 382/194; 399/51; 396/229; 345/590; 345/603; 345/604; 345/601; 345/602; 348/207.99; 348/221.1

(58) Field of Classification Search ................ 358/1.9, 358/520; 382/194; 399/51; 345/590; 348/221.1, 348/362

See application file for complete search history.

(56) References Cited

U.S. PATENT DOCUMENTS

| | | | | |
|---|---|---|---|---|
| 5,060,060 A | * | 10/1991 | Udagawa et al. | 358/520 |
| 5,181,105 A | * | 1/1993 | Udagawa et al. | 358/520 |
| 5,446,504 A | * | 8/1995 | Wada | 348/645 |
| 5,721,628 A | * | 2/1998 | Takaragi et al. | 358/518 |
| 5,874,988 A | * | 2/1999 | Gu | 348/97 |
| 5,966,222 A | * | 10/1999 | Hirata et al. | 358/520 |
| 5,982,925 A | * | 11/1999 | Koizumi et al. | 382/166 |
| 6,351,558 B1 | * | 2/2002 | Kuwata | 382/168 |
| 6,360,008 B1 | * | 3/2002 | Suzuki et al. | 382/167 |
| 6,373,595 B1 | * | 4/2002 | Semba et al. | 358/1.9 |
| 6,417,891 B1 | * | 7/2002 | Cacciatore et al. | 348/649 |
| 6,449,060 B1 | * | 9/2002 | Kawai et al. | 358/1.9 |
| 6,583,820 B1 | * | 6/2003 | Hung | 348/362 |
| 6,788,812 B1 | * | 9/2004 | Wilkins | 382/167 |
| 6,816,200 B1 | * | 11/2004 | Gough | 348/362 |
| 6,823,083 B1 | * | 11/2004 | Watanabe et al. | 382/167 |
| 6,868,179 B2 | * | 3/2005 | Gruzdev et al. | 382/167 |
| 6,873,442 B1 | * | 3/2005 | Gindele et al. | 358/471 |
| 6,947,594 B2 | * | 9/2005 | Watanabe et al. | 382/167 |

(Continued)

FOREIGN PATENT DOCUMENTS

| | | | |
|---|---|---|---|
| JP | 05-137060 | | 6/1993 |
| JP | 06-292220 | | 10/1994 |
| JP | 07-288837 | | 10/1995 |
| JP | 10-070680 | | 3/1998 |
| JP | 10-257515 | | 9/1998 |
| JP | 11-055564 | | 2/1999 |
| JP | 2000-184270 | * | 6/2000 |
| JP | 2000-201295 | * | 7/2000 |
| JP | 2003-078921 | | 3/2003 |

*Primary Examiner*—Aung S. Moe
*Assistant Examiner*—Beniyam Menberu
(74) *Attorney, Agent, or Firm*—Westerman, Hattori, Daniels & Adrian, LLP.

(57) ABSTRACT

A digital camera includes a CCD imager. When a display-use UYV signal is generated on the basis of an RGB signal of an object image photographed by the CCD imager, a CPU detects a color saturation degree of the RGB signal and reduces dynamic range of a U signal and a V signal on the basis of the detected color saturation degree. Thus, a color on the basis of the U signal and the V signal is aboundingly included within a color reproducing range of a monitor.

13 Claims, 10 Drawing Sheets

U.S. PATENT DOCUMENTS

| | | | |
|---|---|---|---|
| 7,023,484 B2* | 4/2006 | Watanabe | 348/364 |
| 7,072,506 B1* | 7/2006 | Hirota et al. | 382/162 |
| 7,092,122 B2* | 8/2006 | Iwaki | 358/1.9 |
| 2003/0179398 A1* | 9/2003 | Takano et al. | 358/1.9 |
| 2004/0233307 A1* | 11/2004 | Tsujino | 348/255 |
| 2005/0152597 A1* | 7/2005 | Spaulding et al. | 382/162 |
| 2005/0200921 A1* | 9/2005 | Yuan et al. | 358/518 |
| 2005/0270412 A1* | 12/2005 | Kamon et al. | 348/362 |
| 2006/0098253 A1* | 5/2006 | Masuno et al. | 358/518 |
| 2006/0257022 A1* | 11/2006 | Hayaishi | 382/167 |

* cited by examiner

| PIXEL NUMBER | R | G | B | Y |
|---|---|---|---|---|
| 1 | | | | |
| 2 | | | | |
| 3 | | | | |
| ⋮ | | | | |
| n | | | | |

DIGITAL CAMERA

BACKGROUND OF THE INVENTION

1. Field of the Invention

The present invention relates to a digital camera, and more specifically to a digital camera for displaying an image of a photographed object on a monitor.

The present invention relates to a digital camera, and more specifically to a digital camera for determining optimal exposure amount on the basis of an image signal of the photographed object.

2. Description of the Prior Art

In a digital camera, when a shutter button is pressed, a YUV signal is generated on the basis of an RGB signal obtained by pre-exposure of an image sensor, and an optimal exposure amount is determined such that an integration value of the Y signal (a luminance evaluation value) satisfies a predetermined condition. Main exposure of the image sensor is performed according to the optimal exposure amount, and the YUV signal based on the RGB signal obtained by the main exposure is recorded on a recording medium. When a reproducing mode is set, the YUV signal is reproduced from the recording medium, and an image based on the YUV signal is displayed on the monitor.

However, even if an object is photographed with the optimal exposure amount, if color reproducing range of a monitor is narrower than dynamic range of a U signal or a V signal, color saturation may occur on a display image. This problem becomes prominent when there is deviation in a color of the object. Paying attention to a ratio of the RGB signal indicating a red flower photographed in a macro-mode, for example, an R level becomes extremely high, and a G level and a B level become equal to 0. Since the Y signal used for luminance evaluation is generated on the basis of the RGB signal, when the ratio of the RGB signal is extremely distorted, even if the optimal exposure amount is determined such that the luminance evaluation value satisfies the predetermined condition, the level of the R signal obtained by the main exposure becomes still high. Thereupon, the U signal and the V signal based on the main exposure are also out of the color reproducing range of the monitor, and therefore, the color saturation occurs on the display image.

Furthermore, in a prior art in which the optimal exposure amount is calculated such that the luminance evaluation value satisfies the predetermined condition, brightness of a main object image may be short depending on a background. That is, the background of high-luminance (e.g., blue sky in summer) makes the luminance evaluation value high, and the low optimal exposure amount makes the main object image located at the center of the screen dark.

SUMMARY OF THE INVENTION

Therefore, it is a primary object of the present invention to provide a novel digital camera.

Another object of the present invention is to provide a digital camera capable of finely reproducing a color of a photographed image even if a color reproducing range of the display device is narrow.

The other object of the present invention is to provide a digital camera capable of properly adjusting exposure amount.

According to the present invention, a digital camera which generates a color relating signal for display on the basis of a color information signal corresponding to a photographed object image, comprises: a color saturation degree detector for detecting a color saturation degree of the color information signal; and a reducer for reducing dynamic range of the color relating signal on the basis of the color saturation degree.

When the color relating signal for display is generated on the basis of the color information signal corresponding to the photographed object image, the color saturation degree of the color information signal is detected by the color saturation degree detector. The reducer reduces the dynamic range of the color relating signal on the basis of the detected color saturation degree. The color based on the color relating signal can be included within a color reproducing range of the display device by the reduction of the dynamic range. Accordingly, although a width of a tone of the color becomes narrow, the photographed image can be finely displayed.

In a case an operation according to a predetermined coefficient is performed on the color information signal upon generating the color relating signal, it is preferable the predetermined coefficient is adjusted on the basis of the color saturation degree. If the operation is multiplication of the color information signal by the predetermined coefficient, the predetermined coefficient can be reduced on the basis of the color saturation degree.

In a case the number of pixels in which a color level exceeds a threshold value (a first number of pixels) is detected as color saturation degree, the color saturation degree is precisely obtained. Furthermore, in a case a luminance signal is generated on the basis of the color information signal, and the number of pixels in which a level of the generated luminance signal exceeds a threshold value (a second number of pixels) is detected as a luminance saturation degree, the predetermined coefficient may be determined on the basis of a subtraction result subtracting the second number of pixels from the first number of pixels. Thus, the predetermined coefficient may be determined by the number of pixels in which the color saturation only occurs.

According to the present invention, a digital camera which calculates an optimal exposure amount on the basis of an image signal of an object photographed with a predetermined exposure amount, comprises: a detector for respectively detecting saturation degrees of luminance at a plurality of portions forming a screen on the basis of the image signal; a determiner for determining a correction coefficient of the predetermined exposure amount on the basis of the saturation degrees detected by the detector; and a corrector for correcting the predetermined exposure amount on the basis of the correction coefficient determined by the determiner so as to obtain the optimal exposure amount.

When the optimal exposure amount is calculated on the basis of the image signal of the object photographed with a predetermined exposure amount, the detector respectively detects the saturation degrees of the luminance at the plurality of portions forming the screen on the basis of the image signal, and the determiner determines the correction coefficient of the predetermined exposure amount on the basis of detected saturation degrees. The corrector corrects the predetermined exposure amount on the basis of the determined correction coefficient, and whereby, the optimal exposure amount is obtained. That is, the optimal exposure amount is determined respectively taking account of the luminance saturation degrees at the plurality of portions forming the screen. Accordingly, the optimal exposure amount can be suitably obtained.

In a case the plurality of portions includes a first portion in which a main object exists and a second portion in which a background exists, a first value is preferably determined as the correction coefficient when the saturation degree of the first portion is more than a first threshold value and less than a second threshold value and the saturation degree of the second portion is less than a third threshold value. Furthermore, a second value smaller than the first value is determined as the correction coefficient when the saturation degree of the first portion is more than the second threshold value and the saturation degree of the second portion is less than the third threshold value. Thus, the optimal exposure amount for the main object can be obtained.

In addition, when the saturation degree of the first portion is more than the second threshold value and the saturation degree of the second portion is more than the third threshold value, a third value smaller than the first value and larger than the second value may be determined as the correction coefficient. In a case of photographing at a place such as a sandy coast in summer and etc., both of the first portion and the second portion become high-luminance. Herein, if the correction coefficient is set to the third value, a garish air in summer can be expressed.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
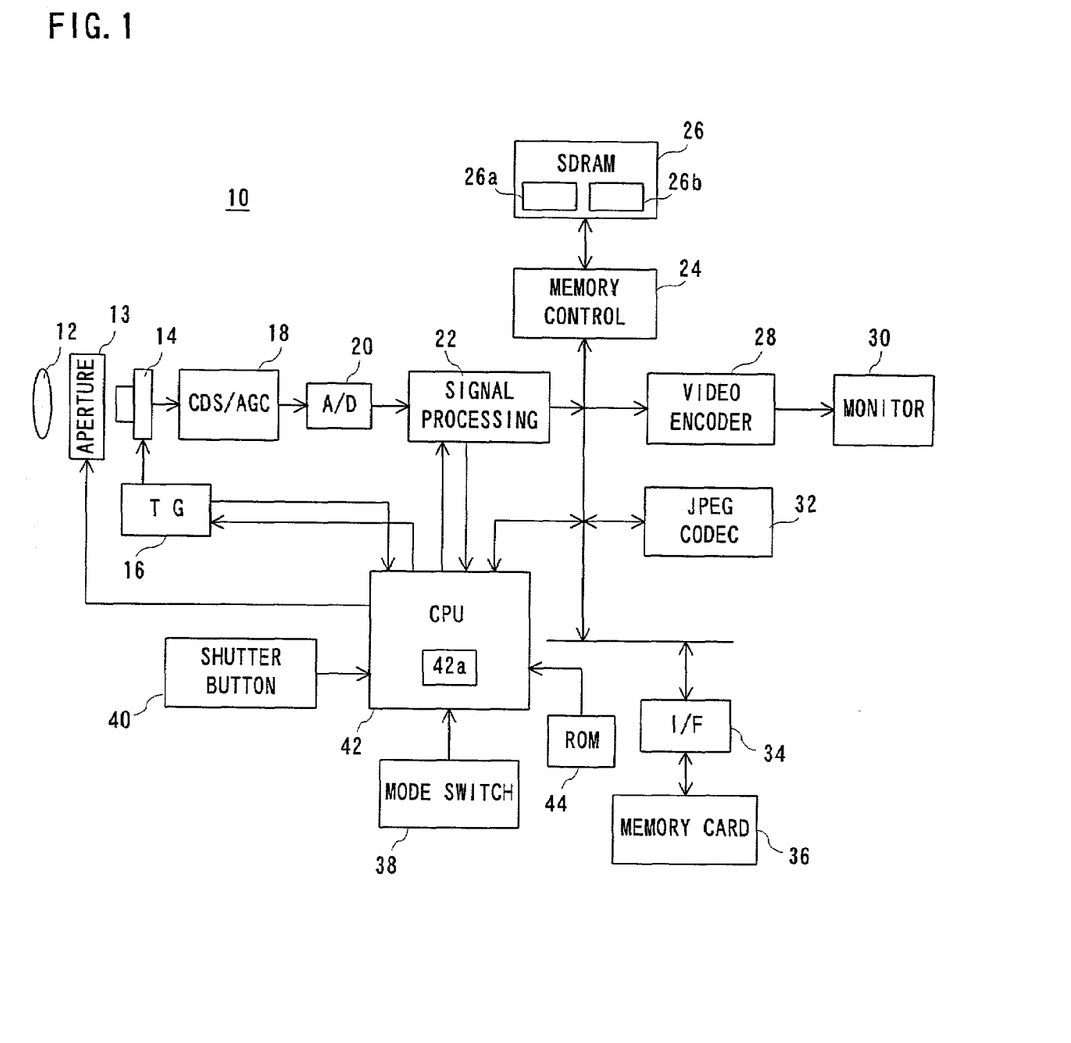
FIG. 1 is a block diagram showing one embodiment of the present invention.

Referring to FIG. 1, a digital camera 10 of this embodiment includes an optical lens 12 and an aperture member 13. An optical image of an object is incidented to a light-receiving surface of a CCD imager (an image sensor) 14 through these members. A camera signal (a raw image signal) corresponding to the incidented optical image is generated by photoelectric conversion on the light-receiving surface. It is noted that the light-receiving surface is covered with a primary color filter having a Bayer array (not shown), and each pixel signal forming the camera signal has any one of color information of R, G, and B.

When a photographing mode is selected by a mode change-over switch 38, a CPU 42 respectively sets an aperture amount and an exposure time (shutter speed) in the aperture member 13 and a timing generator (TG) 16, and instructs the TG 16 to make an exposure every $\frac{1}{15}$ second. The TG 16 exposes the CCD imager 14 every $\frac{1}{15}$ second, and reads out from the CCD imager 14 the camera signal generated by the exposure. A camera signal of each frame read out every $\frac{1}{15}$ second is subject to well-known noise removal and level adjustment in a CDS/AGC circuit 18 so as to be converted to a digital signal in an A/D converter 20.

A signal processing circuit 22 performs signal processing such as color separation, white balance adjustment, color adjustment (color tone correction), YUV conversion, and etc. on the camera signal outputted from the A/D converter 20 so as to generate an image signal including a Y signal (luminance), a U signal (color difference: R–Y) and a V signal (color difference: B–Y). The image signal of each frame thus generated is applied to a memory control circuit 24 and written into an image signal storing area 26a of an SDRAM 26 by the memory control circuit 24.

A video encoder 28 makes the memory control circuit 24 read out the image signal in the image signal storing area 26a. Then, the video encoder 28 encodes the image signal of each frame thus read to a composite image signal of an NTSC format and applies the encoded composite image signal to a monitor (LCD) 30. The monitor 30 is displayed with a real-time motion image (a through image) of the object at a frame rate of 15 fps.

When a shutter button 40 is pressed, the CPU 42 instructs the TG 16 to perform a main exposure after performing the color adjustment described later, and applies a compression instruction to a JPEG codec 32 at a time the image signal based on the main exposure is stored in the image signal storing area 26a of the SDRAM 26. The JPEG codec 32 makes the memory control circuit 24 read out one frame of image signal stored in the image signal storing area 26a so as to perform a compression process on the read image signal in compliance to a JPEG format. When a compressed image signal is obtained, the JPEG codec 32 applies the generated compressed image signal to the memory control circuit 24. The compressed image signal is stored in a compressed signal storing area 26b of the SDRAM 26 by the memory control circuit 24.

After completion of a storing process of the compressed image signal, the CPU 42 reads out the compressed image signal from the compressed signal storing area 26b through the memory control circuit 24, and records the read compressed image signal onto a memory card 36 through an I/F circuit 34. Thus, an image file is created within a memory card 36. It is noted the memory card 36 is a detachable involatile recording medium and when attached to a slot (not shown), can be accessed by the CPU 42.

When a reproducing mode is selected by the mode change-over switch 38, the CPU 42 reads out the compressed image signal from the memory card 36 through the I/F circuit 34 and stores the read compressed image signal in the compressed signal storing area 26b through the memory control circuit 24. After completion of a storing process, the CPU 42 applies an expansion instruction to the JPEG codec 32, and applies a processing instruction to the video encoder 28. The JPEG codec 32 reads out the compressed image signal from the compressed signal storing area 26b through the memory control circuit 24 and performs an expansion process on the read compressed image signal in compliance to the JPEG format. An expanded image signal is written to the image signal storing area 26a by the memory control circuit 24.

The video encoder 28 repeatedly reads out the expanded image signal from the image signal storing area 26a through the memory control circuit 24. Then, the video encoder 28 encodes each expanded image signal thus read to a composite image signal of the NTSC format, and applies the encoded composite image signal to the monitor 30. Thus, a reproduced image is displayed on the monitor 30.

Figure 2:
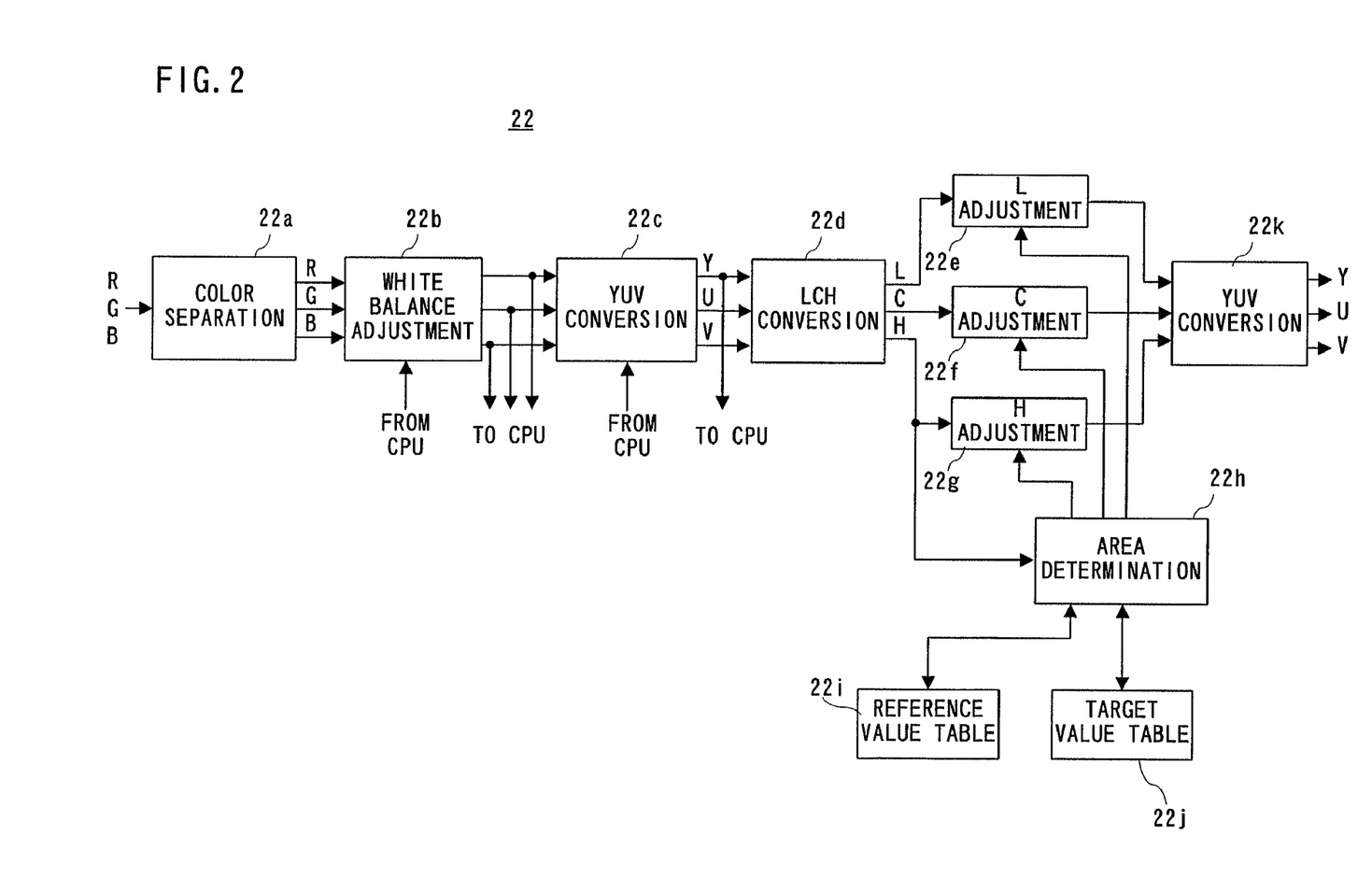
FIG. 2 is a block diagram showing one example of a signal processing circuit.

The signal processing circuit 22 is constituted as shown in FIG. 2. The camera signal outputted from the A/D converter 20 is subjected to the color separation by a color separation circuit 22a. That is, since each pixel forming the camera signal has any one of an R information signal (an R signal), a G information signal (a G signal) and a B information signal (a B signal), two color information signals which each pixel is short of are interpolated by the color separation circuit 22a. The R signal, the G signal and the B signal forming each pixel are simultaneously outputted from the color separation circuit 22a. The R signal, the G signal and the B signal outputted every 1 pixel are applied to a YUV conversion circuit 22c through a white balance adjustment circuit 22b so as to be converted to a Y signal, a U signal and a V signal. Herein, a conversion ratio of Y:U:V is equal to 1:1:1.

The Y signal, the U signal and the V signal outputted from the YUV conversion circuit 22c is converted to an L signal (luminance), a C signal (chroma), and an H signal (hue) in a LCH conversion circuit 22d, and the converted L signal, C signal and H signal are applied to an L adjustment circuit 22e, a C adjustment circuit 22f and an H adjustment circuit 22g, respectively. The L adjustment circuit 22e, the C adjustment circuit 22f and the H adjustment circuit 22g respectively perform predetermined operations on the inputted L signal, C signal and H signal so as to obtain a corrected L signal, C signal and H signal. The corrected H signal, C signal and L signal are then restored to the Y signal, the U signal and the V signal by a YUV conversion circuit 22k. The conversion ratio of Y:U:V at this time is equal to 4:2:2 (or 4:1:1). Accordingly, the Y signal, the U signal and the V signal having a ratio of 4:2:2 (or 4:1:1) are outputted from the signal processing circuit 22.

The H signal outputted from the LCH conversion circuit 22d is also applied to an area determination circuit 22h. The area determination circuit 22h determines an area to which the H signal applied from the LCH conversion circuit 22d belongs with reference to a reference value table 22i. Then, the area determination circuit 22h reads out reference values corresponding to a determination result from the reference value table 22i and target values corresponding to the determination result from a target value table 22j. The predetermined operations performed by the L adjustment circuit 22e, the C adjustment circuit 22f and the H adjustment circuit 22g are executed on the basis of the reference values and the target values thus read.

Figure 3:
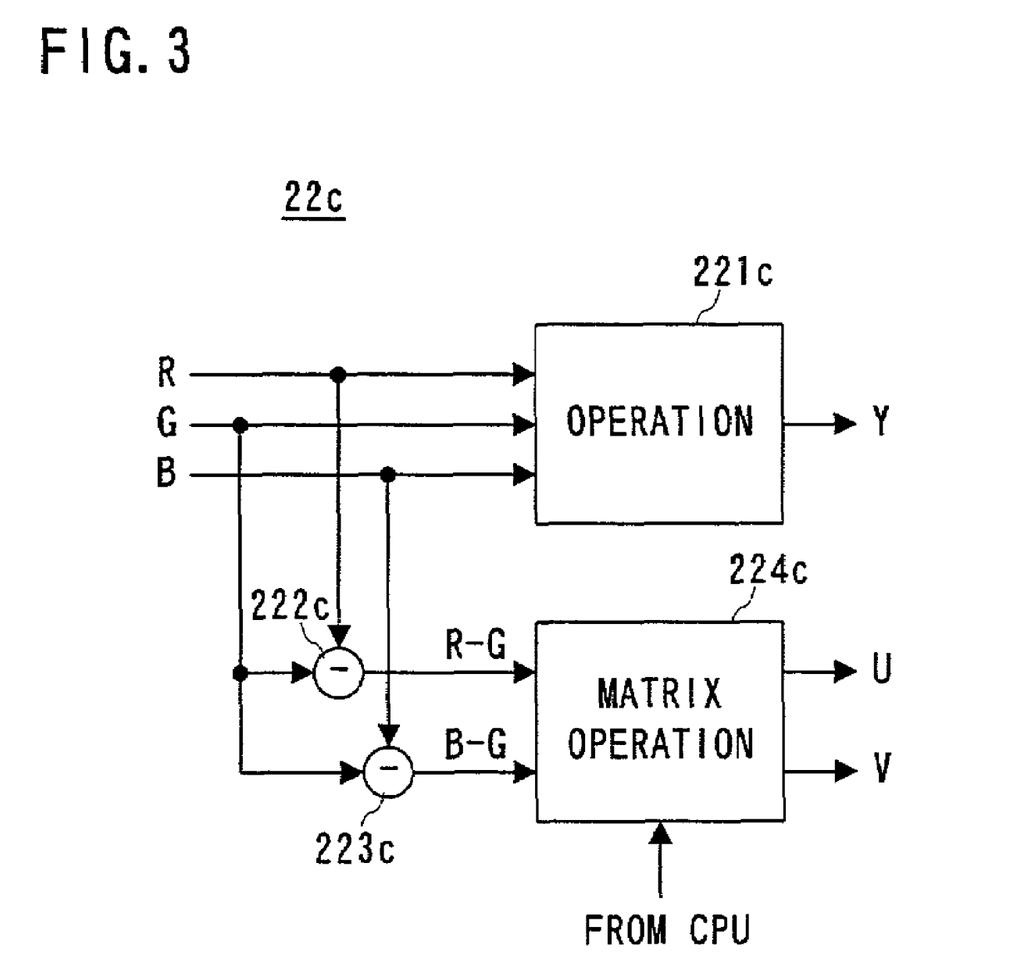
FIG. 3 is a block diagram showing one example of a YUV conversion circuit.

The YUV conversion circuit 22c is constituted as shown in FIG. 3. An operation circuit 221c performs an operation according to an equation 1 on the R signal, the G signal and the B signal applied from the white balance adjustment circuit 22b so as to generate the Y signal.

$$Y = 6G + 3R + B \quad \text{[equation 1]}$$

On the other hand, a subtracter 222c generates an R-G signal by subtracting the G signal from the R signal, and a subtracter 223c generates a B-G signal by subtracting the G signal from the B signal. The generated R-G signal and B-G signal are subjected to matrix operation according to an equation 2 in a matrix operation circuit 224c, and whereby, the U signal and the V signal are generated. It is noted that, in the main exposure, matrix coefficients shown in the equation 2 can be reduced in a range of 0% to 40% on the basis of a saturation degree (color saturation degree) of the R signal, the G signal and the B signal at a time of the main exposure.

$$\begin{bmatrix} U \\ V \end{bmatrix} = \begin{bmatrix} 0.7 & 0.11 \\ -0.3 & 0.89 \end{bmatrix} \begin{bmatrix} R-G \\ B-G \end{bmatrix} \quad \text{[equation 2]}$$

When a photographing mode is selected, processes according to flowcharts shown in FIG. 4 to FIG. 8 are executed by the CPU 42. It is noted that a control program corresponding to the flowcharts is stored in a ROM 44. First, a through image display process is performed in a step S1, and it is determined whether or not the shutter button 40 is operated in a step S3. While the shutter button 40 is not operated, an AE process for a monitor is performed in a step S5, and then, the process returns to the step S1. Thus, the aperture amount set to the aperture member 13 and the exposure time set to the TG 16 are repeatedly adjusted, and therefore, the through image having suitable brightness is displayed on the monitor 30. It is noted the processes in steps S1 and S5 are executed in response to a VD pulse generated every 1/15 second from the TG 16.

Figure 4:
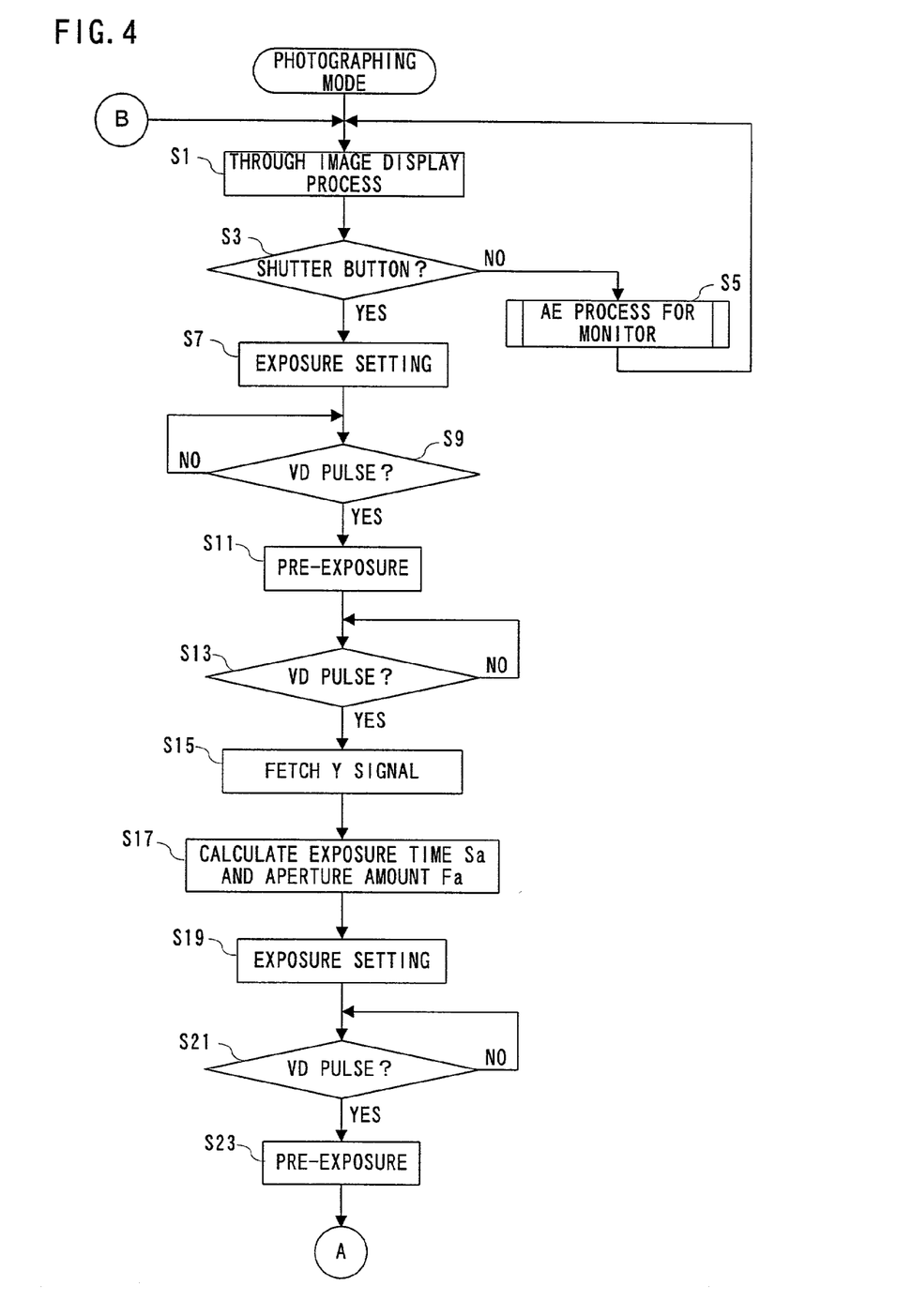
FIG. 4 is a flowchart showing a part of operation of a CPU.

When the shutter button 40 is operated, an exposure setting for photometry is performed in a step S7. Specifically, the exposure time the same as that of the through image display process is set to the TG 16, and a maximum opening value of the aperture amount is set to the aperture member 13. It is determined whether or not the VD pulse is applied from the TG 16 in a step S9, and if "YES" is determined, the pre-exposure for the photometry is instructed to the TG 16 in a step S11. The TG 16 performs the pre-exposure at a current frame to which the instruction is applied and reads out from the CCD imager 14a camera signal generated by the pre-exposure at a following frame succeeding to the current frame. The Y signal based on the read camera signal is outputted from the YUV conversion circuit 22c shown in FIG. 2 at the same frame as a reading-out frame. Therefore, it is determined whether or not the VD pulse is generated in a step S13, and if "YES" is determined, one frame of Y signal is fetched from the YUV conversion circuit 22c in a step S15. The fetched one frame of Y signal is a Y signal based on the pre-exposure in the step S11.

An exposure time Sa and an aperture amount Fa are calculated on the basis of the fetched Y signal in a step S17. Specifically, a luminance evaluation value Iya is obtained by integrating the Y signal throughout one frame period, and then the exposure time Sa and the aperture amount Fa in which the luminance evaluation value Iya satisfies a predetermined condition are calculated. In a step S19, the aperture amount Fa is set to the aperture member 13, and the exposure time Sa is set to the TG 16. It is noted the exposure setting in the step S19 is an exposure setting for the color adjustment, exposure time adjustment, and the white balance adjustment.

Figure 5:
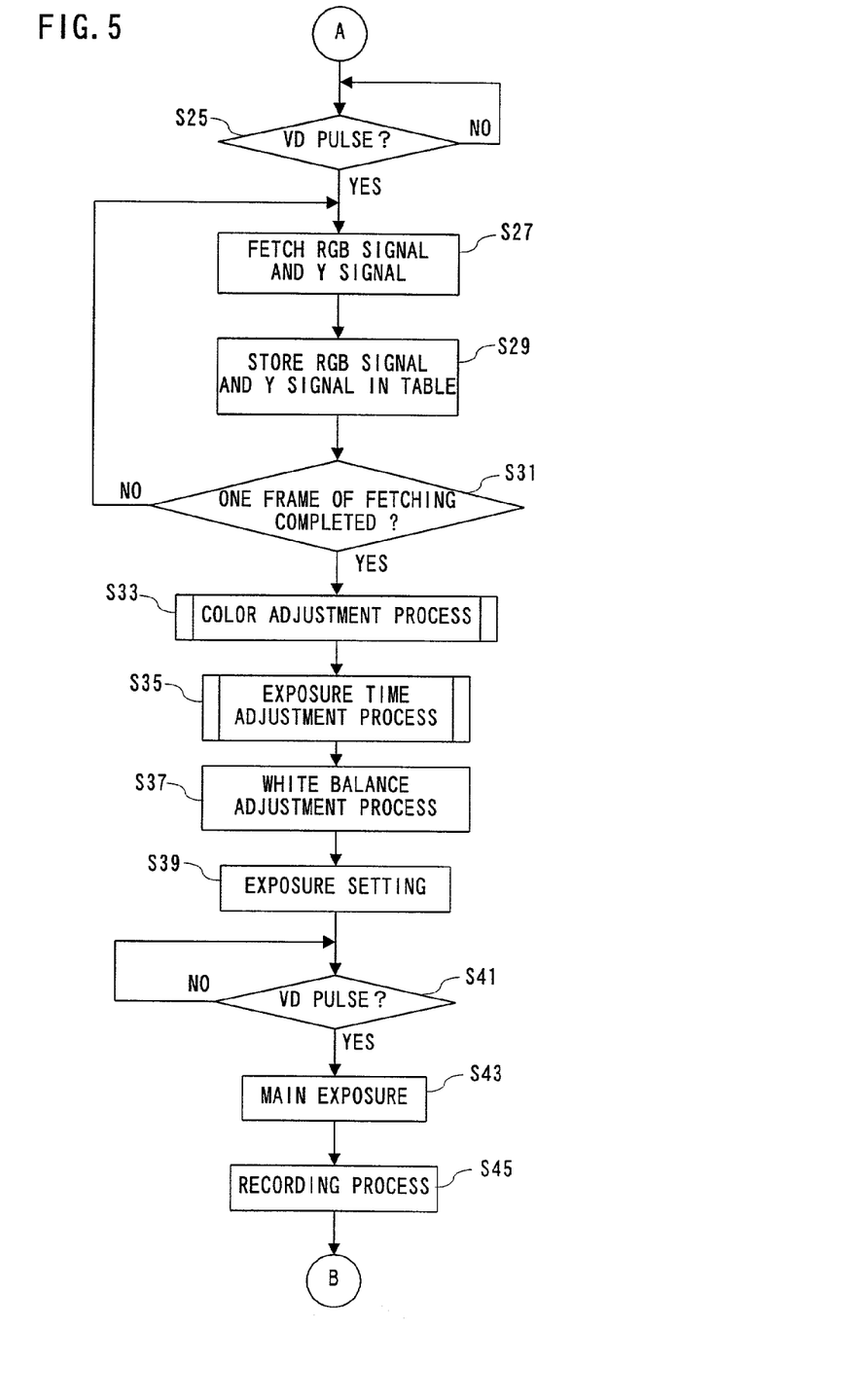
FIG. 5 is a flowchart showing another part of the operation of the CPU.

When the VD pulse is generated after completion of the exposure setting, "YES" is determined in a step S21, and the pre-exposure is instructed to the TG 16 in a step S23. The TG 16 performs the pre-exposure according to the exposure time Sa, and reads out the camera signal generated by the pre-exposure from the CCD imager 14. When the VD pulse is generated after the instruction of the pre-exposure, the process proceeds from a step S25 to a step S27, and the RGB signal outputted from the white balance adjustment circuit 22b and the Y signal outputted from the YUV conversion circuit 22c are fetched. Both of the RGB signal and the Y signal fetched are signals based on the pre-exposure in the step S23. The fetched RGB signal and Y signal are stored in the table 42a shown in FIG. 9 in a step S29. At this time, a common pixel number is assigned to the RGB signal and the Y signal in the same pixel. It is determined whether or not one frame of fetching is completed in a step S31, and the processes from the steps S27 to S29 are repeated until "YES" is determined.

After completion of one frame fetching, a color adjustment process, an exposure time adjustment process and a white balance adjustment process are performed in steps S33, S35, and S37, respectively. The matrix coefficients shown in the equation 2 are adjusted by the color adjustment process, an optimal exposure time Sb is obtained by the exposure time adjustment process, and a gain in the white balancing adjustment circuit 22b shown in FIG. 2 is set to the optimal value by the white balance adjustment process. The exposure time Sb obtained in the step S35 is set to the TG 16 in a step S39. It is noted the aperture amount Fa is retained as to the aperture member 13.

When the VD pulse is generated after completion of the exposure setting in the step S39, "YES" is determined in a step S41, and the main exposure is instructed to the TG 16 in a step S43. The TG 16 performs the main exposure according to the exposure time Sb, and reads out the camera signal thus generated from the CCD imager 14. The read camera signal is converted to the YUV signal by the signal processing circuit 22, and the converted YUV signal is stored in the SDRAM 26. In a step S45, a compression instruction is applied to the JPEG codec 32, and the compressed image signal generated by the JPEG code 32 and held in the SDRAM 26 is recorded on the memory card 36 in a file format. After completion of such a recording process, the process returns to the step S1.

Figure 6:
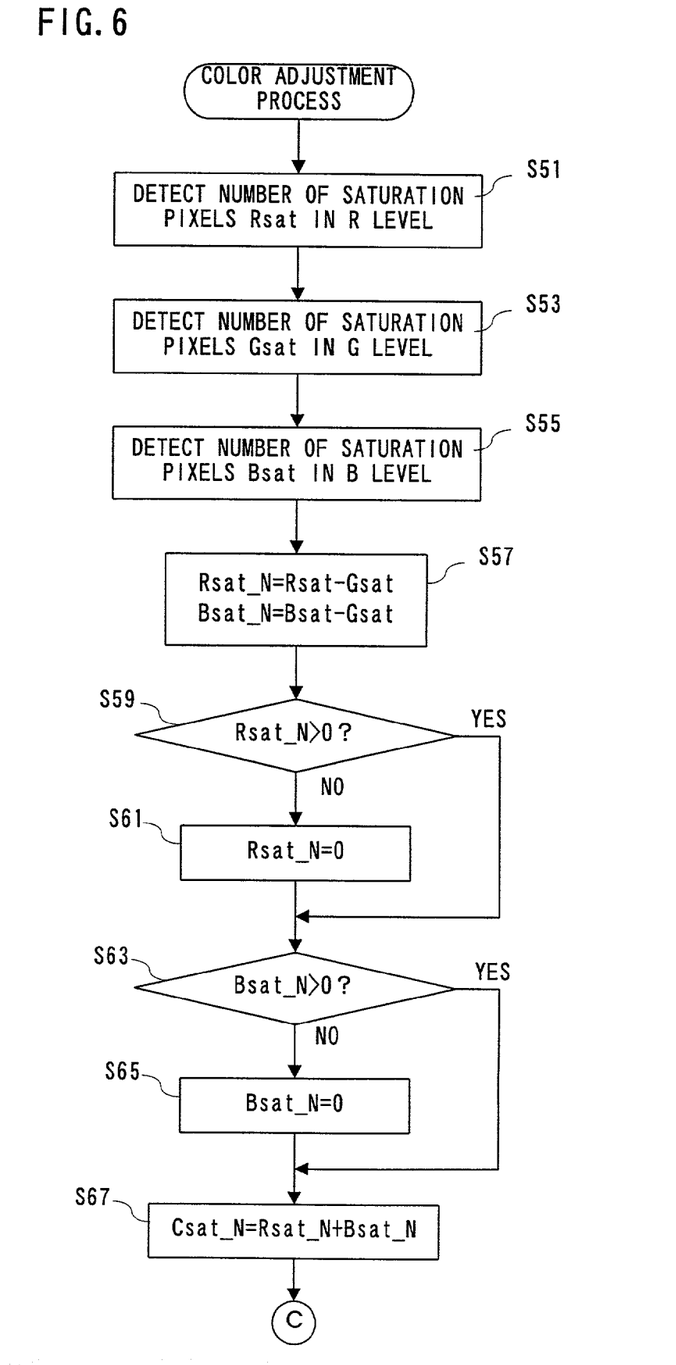
FIG. 6 is a flowchart showing the other part of the operation of the CPU.
Figure 7:
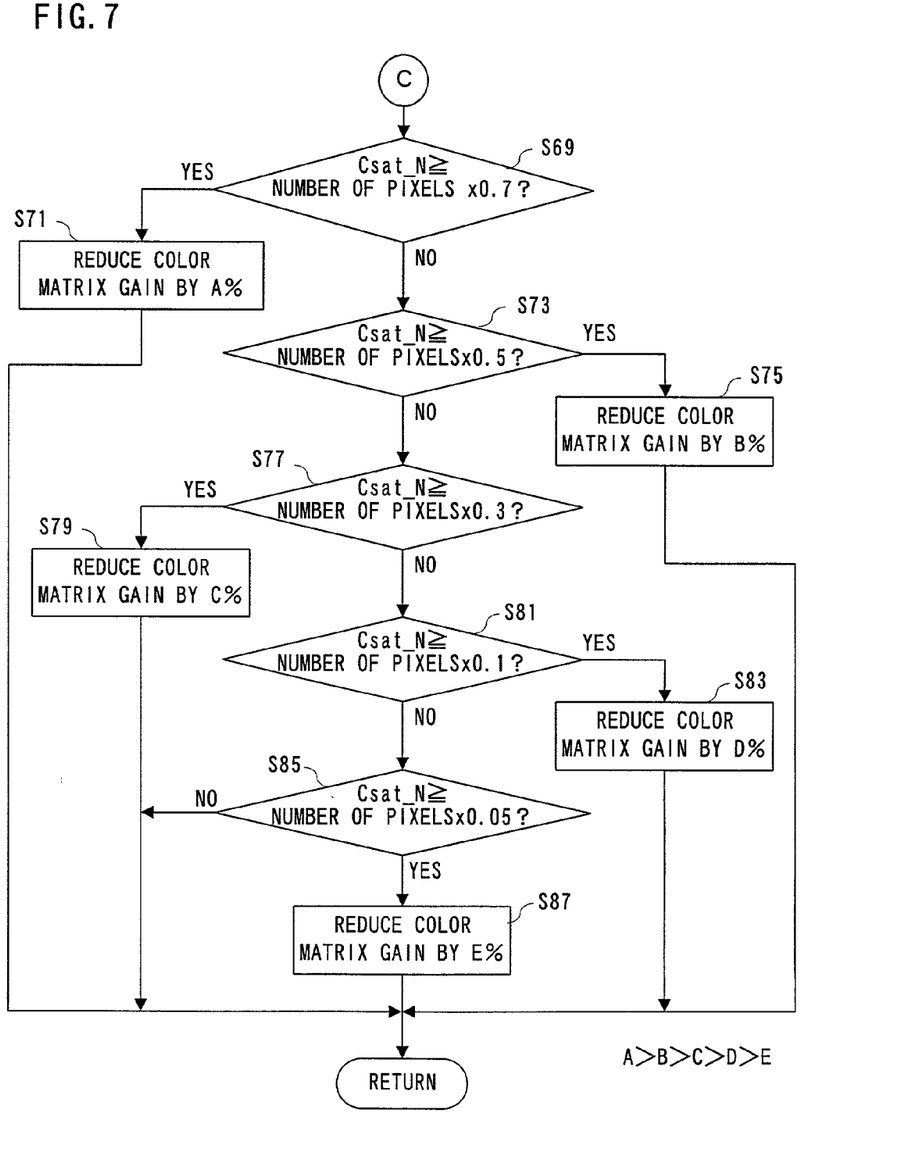
FIG. 7 is a flowchart showing a further part of the operation of the CPU.
Figure 9:
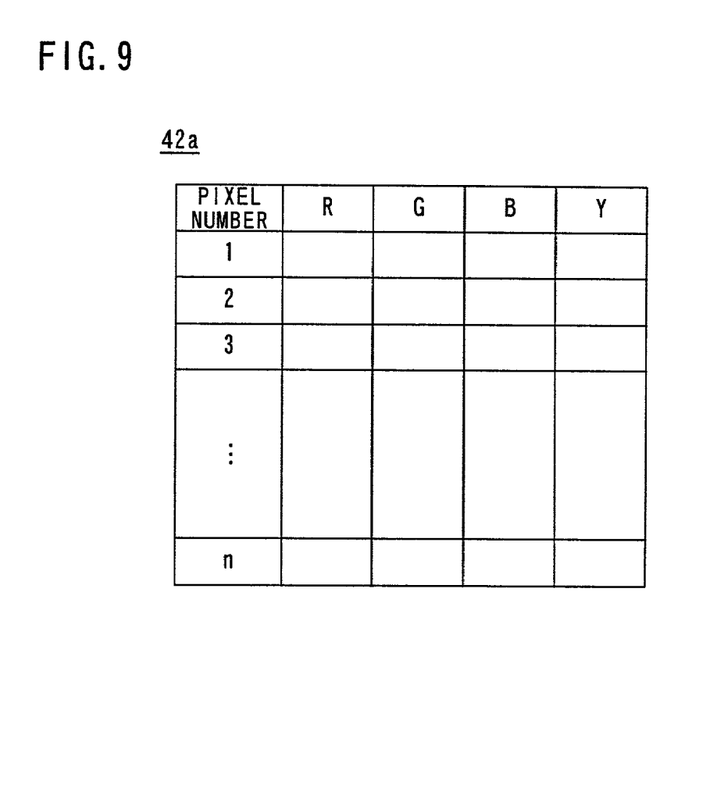
FIG. 9 is an illustrative view showing one example of a table storing a RGB signal and a Y signal.

The color adjustment process in the step S33 complies with subroutines shown in FIG. 6 and FIG. 7. First, the total number of pixels in which the R signal level is saturated is detected as Rsat in a step S51, the total number of pixels in which the G signal level is saturated is detected as Gsat in a step S53, and the total number of pixels in which the B signal level is saturated is detected as Bsat in a step S55. These processes are performed by comparing each of R signal, G signal and B signal stored in the table 42a with a threshold value, and the number of pixels in which an R level exceeds the threshold value, the number of pixels in which a G level exceeds the threshold value and the number of pixels in which a B level exceeds the threshold value shall be the Rsat, the Gsat and the Bsat, respectively. The detected Rsat, Gsat and Bsat are defined as color saturation degrees of the R signal, the G signal and the B signal, respectively.

A difference number of pixels Rsat_N and a difference number of pixels Bsat_N are calculated by operating an equation 3 in a step S57.

$$Rsat\_N = Rsat - Gsat \quad \text{[equation 3]}$$
$$Bsat\_N = Bsat - Gsat$$

It is determined whether or not the Rsat_N is larger than "0" in a step S59, and if "YES" is determined, the process directly proceeds to a step S63; however, if "NO" is determined, the Rsat_N is set to "0" in the step S61, and then, the process proceeds to the step S63. The same processes as the steps S59 and S61 are performed as to the Bsat_N in the steps S63 and S65. Specifically, the value of the Bsat_N is determined in the step S63, and if a condition of Bsat_N>0 is satisfied, the process directly proceeds to a step S67; however, if a condition of Bsat_N≦0 is satisfied, the Bsat_N is set to "0" in the step S65, and then, the process proceeds to the step S67. The additional value Csat_N is obtained by adding the Rsat_N and the Bsat_N in the step S67.

In a case the R signal level, the G signal level and the B signal level of a certain pixel are all saturated, even if a natural color of an object corresponding to the pixel is red, a reproduced color becomes white. Such the saturation of all the color levels should be avoided by adjusting an exposure amount, and there is a need to remove pixels in which all the color levels are saturated in the color adjustment processing.

On the other hand, as understood from the equation 1, the Y signal is generated by weighting and adding of the R signal, the G signal and the B signal, and therefore, the G signal exerts a great influence upon the Y signal. Furthermore, when the G signal is saturated, the R signal and the B signal are also saturated (i.e., the luminance level is saturated), a phenomenon in which the G signal is saturated while the R signal and the B signal are not saturated doesn't generally occur. Therefore, the Gsat may be defined as a luminance saturation degree.

Thereupon, the Rsat_N calculated according to the equation 3 can be regarded as the total number of pixels in which no luminance saturation occurs and the R signal level is saturated, and the Bsat_N can be regarded as the total number of pixels in which no luminance saturation occurs and the B signal level is saturated. Furthermore, the Csat_N calculated in the step S67 can be regarded as the total number of pixels in which only the color is saturated among the color and the luminance.

It is noted that the steps S59 to S65 are of taken into account that there is a possibility that the Rsat_N or the Bsat_N indicates a numerical value of minus (−) by an error of the setting in the signal processing circuit 22.

In steps S69, S73, S77, S81 and S85, the numerical value indicated by the Csat_N are determined. Where the Csat_N is more than 70% of the number of pixels (effective pixels) forming the 1 screen, the process proceeds from the step S69 to a step S71 so as to reduce the matrix coefficients shown in the equation 2 by A % (=40%). Where the Csat_N is less than 70% and more than 50% of the number of effective pixels, the process proceeds from the step S73 to a step S75 so as to reduce the matrix coefficients shown in the equation 2 by B % (=32%). Where the Csat_N is less than 50% and more than 30% of the number of effective pixels, the process proceeds from the step S77 to a step S79 so as to reduce the matrix coefficients shown in the equation 2 by C % (=24%).

Where the Csat_N is less than 30% and more than 10% of the number of effective pixels, the process proceeds from the step S81 to a step S83 so as to reduce the matrix coefficients shown in the equation 2 by D % (=16%). Where the Csat_N is less than 10% and more than 5% of the number of effective pixels, the process proceeds from the step S85 to a step S87 so as to reduce the matrix coefficients shown in the equation 2 by E % (=8%). After completion of processes in the steps S71, S75, S79, S83, or S87, the process is restored to a hierarchal upper level of a routine. Where the Csat_N is less than 5% of the number of effective pixels, the process is restored to the hierarchal upper level of the routine without modifying the matrix coefficients shown in FIG. 2.

Figure 11:
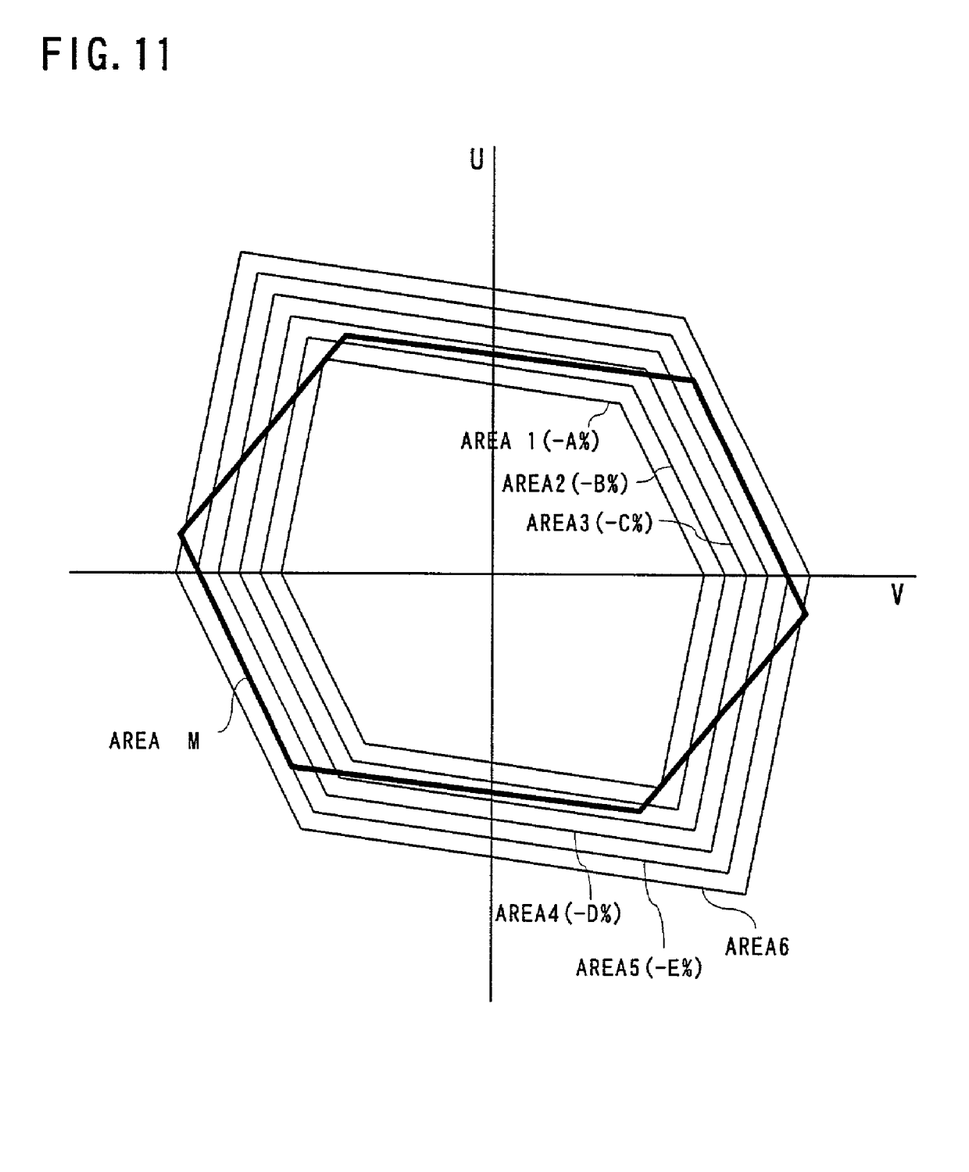
FIG. 11 is an illustrative view showing a part of an operation of a color correction.

A distributable range (dynamic range) of the U signal and the V signal generated by the operation according to the equation 2 is changed as shown in FIG. 11 corresponding to the matrix coefficients. Assuming that the distributable area corresponding to the matrix coefficients decreased by A % is an area 1, the distributable area corresponding to the matrix coefficients decreased by B % is an area 2, the distributable area corresponding to the matrix coefficients decreased by C % is an area 3, the distributable area corresponding to the matrix coefficients decreased by D % is an area 4, the distributable area corresponding to the matrix coefficients decreased by E % is an area 5, and the distributable area corresponding to the matrix coefficients not changed is an area 6, the distributable area is reduced in order of the area 6→the area 5→the area 4→the area 3→the area 2→the area 1. On the other hand, color reproduction range (a range in which the monitor 30 can actually reproduce the color) is an area M indicated by a heavy line. Thereupon, the more the number of the pixels out of the area M is, the more the color saturation is conspicuous on the display screen. Therefore, the distributable range of the U signal and the V signal is reduced in accordance with the total number of pixels in which only the color saturation occurs (=Csat_N).

More specifically, since the matrix coefficients shown in the equation 2 is as it is used at a time of the pre-exposure in the step S23, the Rsat, the Gsat and the Bsat detected in the steps S51 to S55 are related to the number of pixels existing at a periphery of the area 6, and therefore, the Csat_N calculated in the step S67 can be regarded as the number of pixels in which no luminance saturation occurs among the pixels existing at the periphery of the area 6. Furthermore, it is possible to regard that the larger the Csat_N is, the more the number of pixels out of the area M is, and on the contrary, the smaller the Csat_N is, the less the number of pixels out of the area M is. Accordingly, the distributable range of the U signal and the V signal is reduced according to a value of the Csat_N. Therefore, although a width of a tone of the reproduced color is reduced, the color saturation is not conspicuous on the display image.

Figure 8:
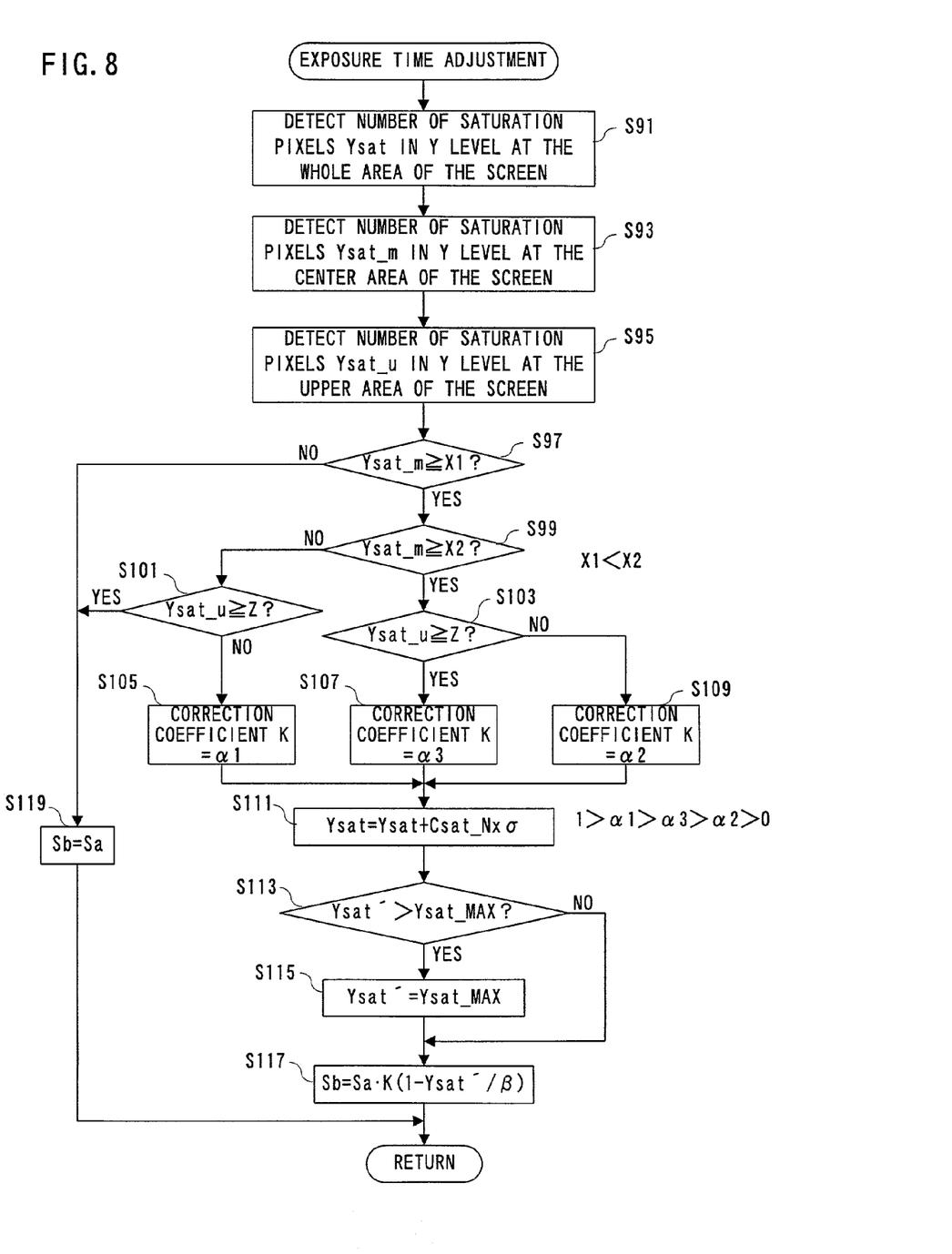
FIG. 8 is a flowchart showing another part of the operation of the CPU.
Figure 10:
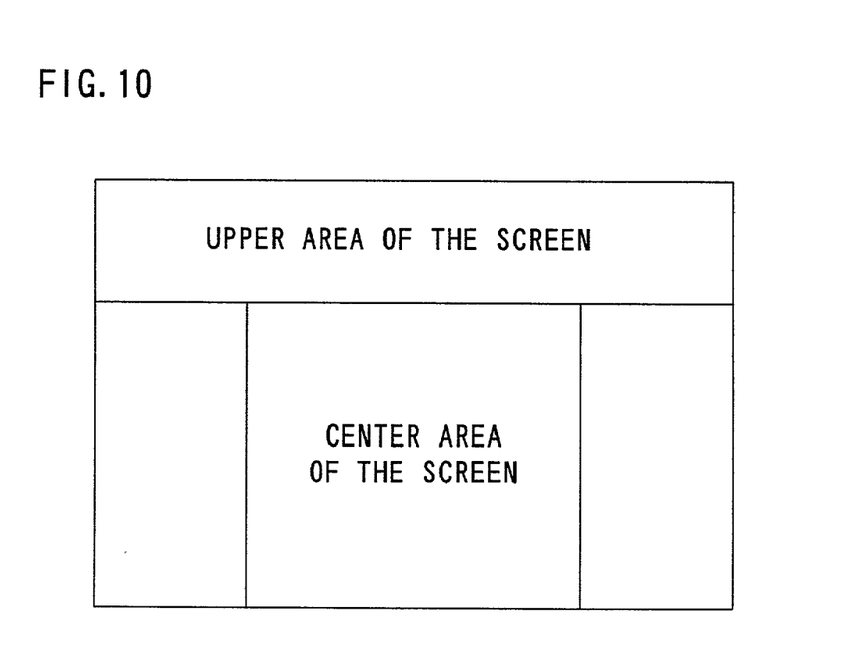
FIG. 10 is an illustrative view showing one example of an upper area and a center area formed on a screen.

The exposure time adjustment process in the step S35 complies with a subroutine shown in FIG. 8. First, the total number of pixels in which the Y signal level is saturated is detected as Ysat in a step S91, the number of pixels in which the Y signal level is saturated at a center area of the screen shown in FIG. 10 is detected as Ysat_m in a step S93, and the number of pixels in which the Y signal level is saturated at an upper area of the screen shown in FIG. 10 is detected as Ysat_u in a step S95. This detecting process is performed with reference to the table 42a shown in FIG. 9, and the detected Ysat, Ysat_m and Ysat_u are regarded as the luminance saturation degrees at the whole screen, the center area of the screen and the upper area of the screen, respectively. The Ysat_m is compared with a threshold value X1 in a step S97, and the Ysat_m is compared with a threshold value X2 (>X1) in a step S99. Furthermore, the Ysat_u is compared with a threshold value Z in steps S101 and S103.

Where a condition of Ysat_m<X1 is satisfied, it is determined the luminance at the center area of the screen is scarcely saturated, and the exposure time Sb is determined to be the same value as the exposure time Sa in a step S119, and then, the process is restored to the hierarchal upper level of the routine. Where conditions of X1<Ysat_m<X2 and Ysat_u≦Z are satisfied, it is determined the luminance at the center area of the screen is saturated to some extent, and the luminance at the upper area of the screen is considerably saturated, the process proceeds from the step S101 to the step S119 so as to determine the exposure time Sb to be the same value as the exposure time Sa. Then, the process is restored to the hierarchal upper level of the routine.

Where conditions of X1≦Ysat_m<X2 and Ysat_u<Z are satisfied, it is determined the luminance at the center area of the screen is saturated to some extent, and the luminance at the upper area of the screen is scarcely saturated. At this time, the process proceeds from the step S101 to the step S105 so as to set a correction coefficient K into α1. Where conditions of Ysat_m≧X2 and Ysat_u<Z are satisfied, it is regarded that the luminance at the center area of the screen is considerably saturated, and the luminance at the upper area of the screen is scarecely saturated. At this time, the process proceeds from the step S103 to the step S109 so as to set the correction coefficient K into α2. Where conditions of Ysat_m≧X2 and Ysat_u≧Z are satisfied, the luminance at both of the center area of the screen and the upper area of the screen are considerably saturated. At this time, the process proceeds from the step S103 to the step S107 so as to set the correction coefficient K into α3. It is noted that a condition 1>α1>α3>α2A>0 is satisfied.

The Ysat is corrected in accordance with an equation 4 in a step S111. That is, the Ysat is renewed in view of the Csat_N.

$$Ysat' = Ysat + Csat\_N \times \sigma \qquad \text{[equation 4]}$$

σ: constant

The Ysat' renewed in a step S113 is compared with a maximum value Ysat_MAX (=number of effective pixels), and where a condition of Y'sat≦Ysat_MAX is satisfied, the process directly proceeds to a step S117; however, where a condition of Y'sat>Ysat_MAX is satisfied, the Y'sat is set to the Ysat_MAX in a step S115, and then, the process proceeds to the step S117. The exposure time Sb for the main exposure is determined according to an equation 5 in the step S117.

$$Sb = Sa \cdot K \cdot (1 - Ysat'/\beta) \qquad \text{[equation 5]}$$

β: constant (>Ysat_MAX)

According to the equation 5, the correction coefficient K determined in the step S105, S107 or S109 is multiplied by the pre-exposure time Sa. Therefore, the smaller the correction coefficient K is, the shorter the main exposure time Sb is.

"NO" is determined in the step S97 in a case the pixel in which the luminance is saturated scarcely exists in a main object image at the center area of the screen. In this case, the pre-exposure time Sa may be directly used, and therefore, the main exposure time Sb is equal to the pre-exposure time Sa. "YES" is determined in the step S101 in a case the luminance of the main object image at the center area of the screen is suitably saturated and the luminance of the background image at the upper area of the screen is considerably saturated. Such a characteristic appears in an image photographed at a sandy beach in summer. In this case, the pre-exposure time Sa is directly utilized as the main exposure time Sb so as to express a garish air in summer.

"NO" is determined in the step S101 in a case the main object image is more or less saturated and the background image is scarcely saturated. Since the image at this time seems not to be an image giving the above-described garish air, the correction coefficient K is set to "α1" so as to make the main exposure time Sb shorter than the pre-exposure time Sa.

"NO" is determined in the step S103 in a case the luminance of the main object image is considerably saturated while the luminance of the background image is not so saturated. In such a case, the main exposure time Sb should be drastically shorter than the pre-exposure time Sa, and the correction coefficient K is set to "α2" being a minimum value.

"YES" is determined in the step S103 in a case both of the main object image and the background image are considerably saturated. In this case, the object seems to be a garish kind such as the sandy coast in summer, and whereby, the correction coefficient K is set to "α3" being an intermediate value between α1 and α2 so as to leave the garish air.

As understood from the above description, when the display-use YUV signal is generated on the basis of the RGB signal of the photographed object image, the CPU 42 detects the color saturation degrees of the RGB signal (S51 to S55), and reduces the dynamic range of the U signal and the V signal on the basis of the detected color saturation degrees (S69 to S87). Thus, the color based on the U signal and the V signal are included within the color reproducing range of the monitor 30, and the color saturation of the display image can be restrained.

Furthermore, when the optimal exposure amount for the main exposure is calculated on the basis of the Y signal of the object obtained by the pre-exposure, the CPU 42 respectively detects the luminance saturation degrees at the center area of the screen and at the upper area of the screen on the basis of the Y signal (S93, S95), determines the correction coefficient on the basis of the detected luminance saturation degrees (S105, S107, S109), and obtains the optimal exposure amount by correcting the pre-exposure amount based on the determined correction coefficient (S117). That is, the optimal exposure amount is properly determined respectively taking account of the luminance saturation degrees at a plurality of areas forming a screen.

It is noted that although the Gsat is subtracted from the respective Rsat and Bsat in obtaining the Rsat_N and Bsat_N in this embodiment, the Ysat can be subtracted in place of the Gsat. Furthermore, since the U signal and the V signal are generated by performing the matrix operation on the RGB signal in this embodiment, the matrix coefficients multiplied by the R signal, the G signal and the B signal is reduced upon changing the distributable range of the U signal and the V signal in this embodiment; however, when the U signal and the V signal are generated by performing a matrix operation on a Ye signal, a Cy signal, a Mg signal and a G signal, matrix coefficients utilized in the operation may be reduced.

In addition, although an image signal reproduced from the memory card is only applied to the monitor 30 in this embodiment, if the reproduced image signal is outputted to the printer, the reproduced image is printed (displayed) on the paper by the printer. In this case, it is also possible to obscure the color saturation. Although the exposure amount of the main exposure is set to the optimal exposure amount by modifying the exposure time, the main exposure amount may be set to the optimal value by changing the amount of aperture.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera which generates a color relating signal for display on the basis of a color information signal corresponding to a photographed object image, comprising:
    a color saturation degree detector for detecting a color saturation degree of the color information signal, said color saturation degree being indicative of a degree that the number of pixels in each of which the color out of the color and the luminance is saturated is large or small;
    a reducer for reducing dynamic range of the color relating signal on the basis of the color saturation degree;
    an operator for performing an operation according to a predetermined coefficient on the color information signal so as to generate the color relating signal, wherein said reducer includes an adjuster for adjusting the predetermined coefficient on the basis of the color saturation degree, and wherein said color saturation degree detector detects a first number of pixels in which a level of the color information signal exceeds a threshold value as the color saturation degree;
    a generator for generating a luminance signal on the basis of the color information signal; and
    a luminance saturation degree detector for detecting a second number of pixels in which the level of the luminance signal exceeds a threshold value as the luminance saturation degree,
    wherein said adjuster includes a subtracter for subtracting said second number of pixels from said first number of pixels, and a determiner for determining the predetermined coefficient on the basis of a subtraction result by said subtracter.

2. A digital camera according to claim 1, wherein the operation by said operator includes multiplication of the color information signal by the predetermined coefficient, and said adjuster reduces the predetermined coefficient on the basis of the color saturation degree.

3. A digital camera which calculates an optimal exposure amount on the basis of an image signal of an object photographed with a predetermined exposure amount, comprising:
    a detector for respectively detecting saturation degrees of luminance at a plurality of portions forming a screen on the basis of the image signal;
    a determiner for determining a correction coefficient of the predetermined exposure amount on the basis of the saturation degrees detected by said detector, wherein the determiner compares the saturation degrees of luminance detected at respective portions of the screen with different threshold values corresponding to the respective portions of the screen to determine the correction coefficient; and
    a corrector for correcting the predetermined exposure amount on the basis of the correction coefficient determined by the determiner so as to obtain the optimal exposure amount,
    wherein said plurality of portions includes a first portion in which a main object exists and a second portion in which a back ground exists, and said determiner includes a first correction coefficient determiner for determining a first value as the correction coefficient when the saturation degree of the first portion is more than a first threshold value and less than a second threshold value and the saturation degree of the second portion is less than a third threshold value, and a second correction coefficient determiner for determining a second value smaller than the first value as the correction coefficient when the saturation degree of the first portion is more than the second threshold value and the saturation degree of the second portion is less than the third threshold value.

4. A digital camera according to claim 3, wherein said determiner further includes a third correction coefficient determiner for determining a third value smaller than the first value and larger than the second value as the correction coefficient when the saturation degree of the first portion is more than the second threshold value and the saturation degree of the second portion is more than the third threshold value.

5. A digital camera, comprising:
an imaging device for outputting an image signal which represents an object scene;
a first creator for creating a color relating signal for display based on the image signal output from said imaging device;
a first detector for detecting the number of pixels producing a color saturation based on the image signal output from said imaging device;
a second detector for detecting the number of pixels producing a luminance saturation based on the image signal output from said imaging device;
a subtractor for subtracting the number detected by said second detector from the number detected by said first detector; and
a changer for changing dynamic range of the color relating signal created by said first creator based on a subtraction result of said subtractor.

6. A digital camera according to claim 5, further comprising a second creator for creating a color information signal based on the image signal output from said imaging device, wherein said first creator includes a calculator for subjecting the color information signal created by said second creator to a calculation referring to a coefficient, and said changer includes an adjuster for adjusting the coefficient depending upon the subtraction result.

7. A digital camera according to claim 6, wherein a calculating operation of said calculator includes multiplication of the color information signal by the coefficient, and said adjuster greatly reduces the coefficient as a numerical value indicated by the subtraction result is increased.

8. A digital camera according to claim 6, wherein the color information signal is a signal having color information of red and blue.

9. A digital camera, comprising:
an imaging device for outputting an image signal which represents an object scene;
a first creator for creating a color information signal based on the image signal output from said imaging device;
a second creator for creating a luminance relating signal based on the image signal output from said imaging device;
a third creator for creating a color relating signal for display based on the image signal output from said imaging device;
a determiner for determining a ratio of a color saturation pixel which is saturated only in color out of the color and luminance based on the color information signal created by said first creator and the luminance relating signal created by said second creator; and
a reducer for greatly reducing dynamic range of the color relating signal created by said third creator as the ratio of the color saturation pixel is increased based on a determination result of said determiner.

10. A digital camera according to claim 9, wherein said third creator includes a calculator for subjecting the color information signal to a calculation referring to a coefficient, and said reducer includes an adjuster for adjusting the coefficient depending upon the ratio of the color saturation pixel.

11. A digital camera according to claim 10, wherein a calculating operation of said calculator includes multiplication of the color information signal by the coefficient, and said adjuster greatly reduces the coefficient as the ratio of the color saturation pixel is increased.

12. A digital camera according to claim 9, further comprising:
a first detector for detecting the number of pixels producing a color saturation based on the color information signal created by said first creator;
a second detector for detecting the number of pixels producing a luminance saturation based on the luminance relating signal created by said second creator; and
a subtractor for subtracting the number detected by said second detector from the number detected by said first detector, wherein said determiner includes a comparer for comparing a subtraction result of said subtractor with a plurality of threshold values which are different from each other.

13. A digital camera according to claim 9, wherein the color information signal is a signal having color information of red and blue, and the luminance relating signal is a signal having color information of green.

* * * * *